United States Patent [19]

Myer

[11] Patent Number: 5,850,416
[45] Date of Patent: Dec. 15, 1998

[54] WIRELESS TRANSMITTER-RECEIVER INFORMATION DEVICE

[75] Inventor: Robert Evan Myer, Denville, N.J.

[73] Assignee: Lucent Technologies, Inc., Murray Hill, N.J.

[21] Appl. No.: 931,261

[22] Filed: Sep. 16, 1997

Related U.S. Application Data

[63] Continuation of Ser. No. 85,090, Jun. 30, 1993, abandoned.

[51] Int. Cl.$^6$ .............................. G06F 17/60; H04B 1/40
[52] U.S. Cl. .......................... 375/221; 375/352; 340/505; 340/825.44; 235/385
[58] Field of Search .................................... 375/219, 221, 375/222, 223, 249, 252, 282; 340/825.54, 825.35, 825.17, 505; 178/4.1 A; 343/702, 741, 742, 788; 235/385; 455/274

[56] References Cited

U.S. PATENT DOCUMENTS

| | | | |
|---|---|---|---|
| 4,500,880 | 2/1985 | Gomersall et al. | 340/825.35 |
| 4,605,844 | 8/1986 | Haggan | 235/380 |
| 4,685,047 | 8/1987 | Phillips, Sr. | 363/126 |
| 4,902,858 | 2/1990 | Yamanami | 178/19 |
| 4,937,586 | 6/1990 | Stevens et al. | 343/702 |
| 5,019,811 | 5/1991 | Olsson et al. | 340/825.17 |
| 5,113,184 | 5/1992 | Katayama | 340/825.54 |
| 5,128,499 | 7/1992 | Morita | 178/19 |
| 5,181,131 | 1/1993 | Yamazaki et al. | 359/56 |
| 5,450,492 | 9/1995 | Hook et al. | 380/28 |

OTHER PUBLICATIONS

Electronic Engineering Times, Article: "Ferroelectric LDCs Aim At Supermarkets," dated Sep. 28, 1992, p. 37, Technology Section.

Electronic Products, Article: "Color, Front–Lit LCDs Combine Sunlight Viewability With Low Power Consumption", date Mar. 1993, pp. 18 & 21, Outlook Section.

Article entitled "24,000 shirts/hour?," published on p. 47 of the Feb. 1, 1993 issue of *Design News*.

Text, "Ultra–High–Frequency Techniques," authored by Brainerd, Koehler, Reich and Woodruff and published in 1942 by D. Van Nostrand Company, Inc., pp. 369, 372–373 and 395–399.

Text "Digital Communications, Fundamentals and Applications," authored by Bernard Sklar and published in 1988 by Prentice Hall, pp. 80 and 81.

*Primary Examiner*—Chi H. Pham
*Assistant Examiner*—William Luther

[57] ABSTRACT

The disclosure is of an indoor transceiver system in which first electromagnetic waves at 20 KHz are transmitted from a single loop primary coil in or adjacent a room to a plurality of data storage devices in the same room and having respective multi-turn secondary coils coupled by an induction coupling to such primary coil to receive such waves which provide both operating power and signals for such devices. Each device is responsive to a signal transmitted thereto by such first waves to transmit information from such device via second electromagnetic waves at 900 MHz. Each device has a panel providing a non-volatile display of information which represents the price of goods proximate the device, and which price is updated from time to time by signals transmitted to the device by such first waves.

9 Claims, 5 Drawing Sheets

WIRELESS TRANSMITTER-RECEIVER INFORMATION DEVICE

This is a Continuation of application Ser. No. 08/085,090 filed Jun. 30, 1993, now abandoned.

FIELD OF THE INVENTION

This invention relates to systems, and components, therefor, in which a transmitter of electromagnetic waves is used in common with a plurality of data providing devices to individually control these devices by way of a wireless coupling thereto so as to selectively cause each of these devices to perform one or more data-related functions.

BACKGROUND OF THE INVENTION

In a short article (in the nature of a column under the heading "Designer's Corner,") entitled "24,000 shirts/hour!," and appearing in the Feb. 1, 1993 issue of the periodical *Design News*, there is disclosed an arrangement in which transponder devices are attached to shirt collars and pant waistbands and contain all routing data for the corresponding garments. "Handheld or stationary reading units 'interrogate' the 64 IDS via bursts of RF energy". A drawing of one such transponder device shows that it comprises a tube and, within the tube, a capacitor, an IC package and an antenna. The rather brief disclosure in the mentioned article, suggests that the transponder device stores as data a particular number which identifies the garment to which the device is attached, and the "hand held or stationary reading units" interrogate each device by transmitting to it bursts of microwaves which provide it with enough power to operate and cause it to read out and transmit by microwaves back to the unit the number stored in that device.

In that arrangement, it appears that the manner of use of a particular reading unit is that the garments to be routed thereby are brought, one at a time, into close proximity with the unit at a particular location relative thereto, and the unit is then energized to transmit to each garment the electromagnetic waves which power and control the transponder attached thereto. In these circumstances, microwaves are well adapted to supply power and signals to the transponder device because it is only a short distance away from the microwave transmitter, and because the microwaves can be focused into a high energy beam directed onto the device. Where, however, the data-providing devices are distributed throughout a room and cannot be brought one at a time to the transmitter, the use of electromagnetic waves of microwave length to operate the devices would be accompanied by the disadvantage that, because microwaves tend to be directive and be subject to reflections in the room so as to interfere with each other and produce standing waves, the distribution of the field strength in the room of the microwaves will be uneven and have null regions therein, i.e., regions of such low field strength that devices located in these regions do not respond to interrogation from the transmitter. Another disadvantage is that circuit components and devices designed for use at microwave frequencies are expensive.

SUMMARY OF THE INVENTION

These and other disadvantages are overcome according to the invention by providing improved methods and apparatus which are characterized by one or both of the following improvements. First, in furnishing power and signals from the transmitter by wireless coupling to data-providing devices at a common site with the transmitter, such as in a room containing both the electromagnetic waves which are of such low frequency that there are no approximate nulls in the field strength of the waves at the location of the devices. Second, the devices incorporate low frequency circuit components to thereby greatly reduce the cost of those devices as compared to what it would be if the components were required to operate at microwave frequencies.

BRIEF DESCRIPTION OF THE DRAWINGS

For a better understanding of the invention, reference is made to the following description of an exemplary embodiment thereof and to the accompanying drawings wherein.

Figure 1:
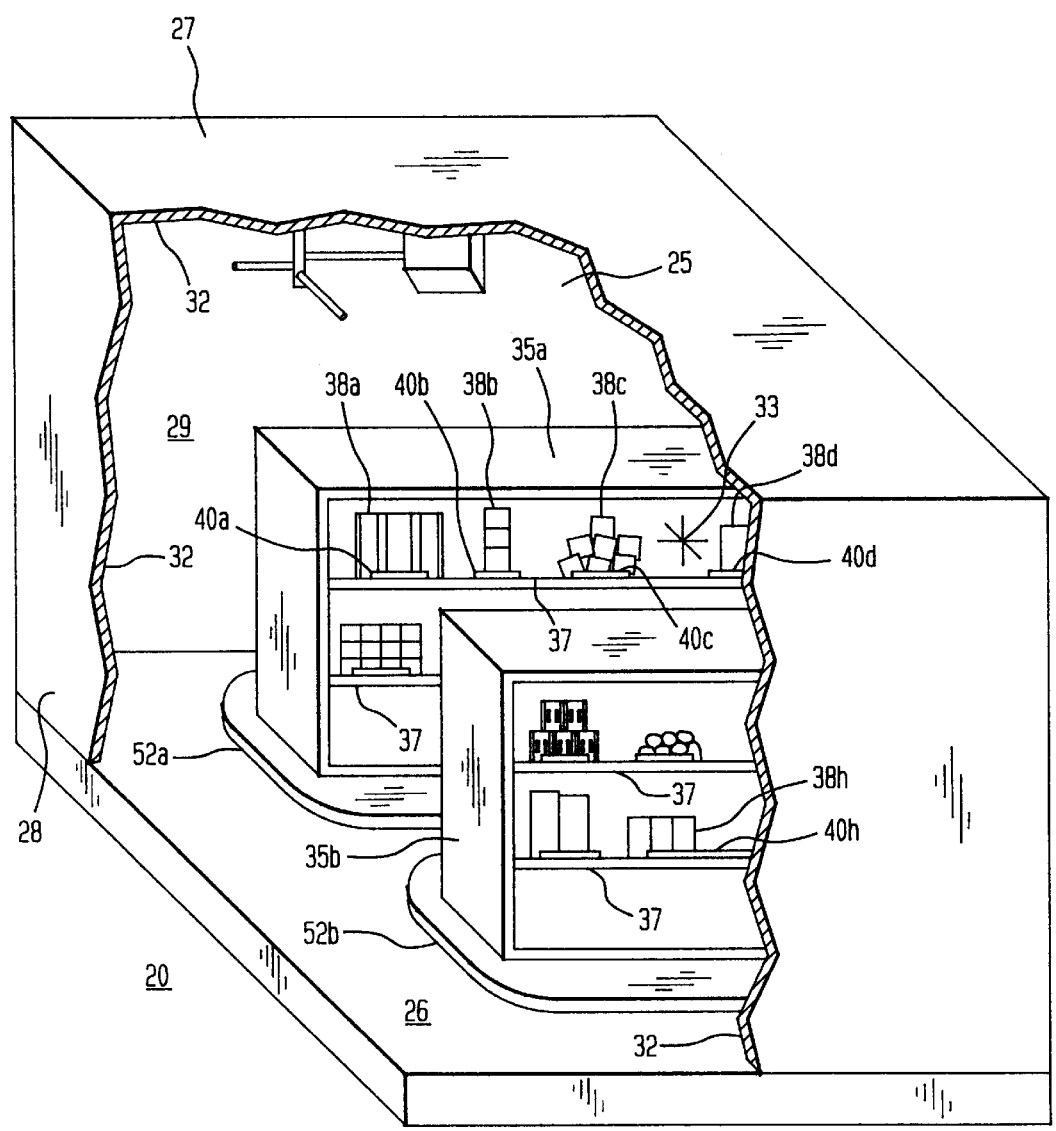
FIG. 1 is an isometric view, partly broken-away, of a building incorporating a room in which goods are sold at prices indicated by wireless controlled price label devices which are parts of an indoor transceiver system according to the invention.

In connection with the description which follows, elements which are counterparts will be designated by the same reference numerals while being differentiated by different letter suffixes for these reference numerals, and it is to be understood that a description of any of such elements shall, unless its context otherwise indicates, be taken as equally applicable to any counterparts of that element. Also the term "lead" as used herein includes in its meaning a bus or multiple conductors or other means for conveying multiple signals in a manner whereby they are separable from each other.

DETAILED DESCRIPTION OF THE EMBODIMENT

Figure 2:
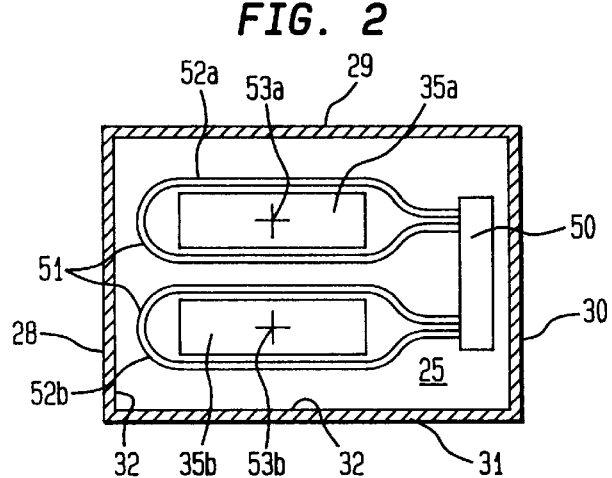
FIG. 2 is a plan view in cross-section of the FIG. 1 building, the cross-section being taken in a horizontal plane located vertically above any doors and windows for the room shown in FIG. 1.

Referring now to FIGS. 1 and 2, the reference numeral 20 designates a building or other structure enclosing a room 25 by a floor 26, overhead 27 and side walls 28, 29, 30 and 31 together defining a three dimensional interior surface 32 bounding room 25. The room's interior space contained within surface 32 has a volumetric center 33. Within room 25 are spaced apart cases 35a, 35b providing open shelves 37 bearing separate groups 38a, 38b, 38c, 38d . . . 38h of goods which may be, say, foodstuffs, and which are for sale.

Disposed on shelves 37 in front of and proximate to the different groups of goods are respectively corresponding price label devices 40a, 40b, 40c, 40d . . . 40h, which are so-called because each device provides a visible indication of the selling price of the goods next to and respectively associated with that device. While the room depicted in FIG. 1 is a small one such as might be found, say in a convenience store in the country, the invention hereof is not limited by the size of the room in which it is used. Indeed, it is highly useful in stores having very large rooms such as those which are used in supermarkets and which may contain as many as 15,000 different kinds of items to be sold, necessitating, of course, as many price labels.

It is notorious that in supermarkets and other kinds of stores as well, the sale price on various goods offered for sale keeps changing so that it is necessary to frequently update the prices posted in the store for those goods. When the notice of such prices is provided by printed labels, to update the prices must be done by the time consuming and expensive procedure of manually replacing the old printed labels with new ones. That costly work is, however, avoided in the store indicated in the room depicted in FIGS. 1 and 2 by an indoor electronic transceiver system 45 (FIG. 5) in which the price label devices 40 are all automatically controlled by electromagnetic waves from a common transmitter unit 50 and an antenna 51 therefor to initially store and display updated prices of the goods associated with that device. Each such device in response to an signal from transmitter 50 identifying that device itself transmits electromagnetic waves to a common receiver 60 (FIG. 5) via an antenna 61 (FIG. 5) therefor to inform the user of the system of the price then displayed by that device or of other matters relating to its operation.

The common transmitter 50 generates electromagnetic waves for which a satisfactory frequency is, say, 20 KHz so that the wavelength of the waves is about 9 miles. As befits that long wavelength, the antenna 51 for transmitter 50 is large in size and takes the form in FIGS. 1 and 2 of two primary coils 52a, 52b respectively encircling the cases 35a, 35b and bonded to floor 26 in shallow grooves formed therein and of a depth so that the coils do not project above the floor surface. The coils may also be embedded in or lie beneath floor 26. As shown, the coils 52a, 52b have a horizontal lie corresponding to the horizontal lie of floor 26, and have respective vertical axes 53a, 53b therefor. Each coil consists of a single loop of insulated copper wire which extends around the coil axis and which, although it is slightly open near transmitter 50 (FIG. 2), is preferably a loop which is mostly closed around its extent.

Alternative acceptable configurations for the antenna 51 is for it to be a single turn or multi-turn primary coil disposed with a horizontal lie above any doors and windows for room 25 and mounted by the overhead 27 or the walls 28–31 so as to be at the bounding surface 32 of room 25. Consonant however with it so being at surface 32, such a coil may be mounted by overhead 27 on its inner side or (assuming the structure of the overhead does not contain too much metal) within the overhead or on its outer side. Alternatively, such one coil may be mounted by walls 28–31 on the inner side of or within or outside those walls to extend around the enclosing structure provided by these walls.

In all the configurations described above which are suitable for antenna 51, the lie of the primary coil or coils conforms to the lie of the portions of bonding surface 32 next to that coil or coils, and the primary coil or coils lack any portions projecting substantially away from surface 32 into room 25.

As a further consideration, the antenna 51 need not be in room 25 or mounted by part of the structure 26–31 enclosing that room but, rather, may be outside of and away from that structure so long as the antenna is disposed to propagate electromagnetic waves into room 25 in a manner to be wireless coupled with all the price label devices 40 therein. As a preferred location, however, the antenna coil or coils should be positioned nearer to the bounding surface 32 of room 25 than to the volumetric center 33 therefor.

Figure 4:
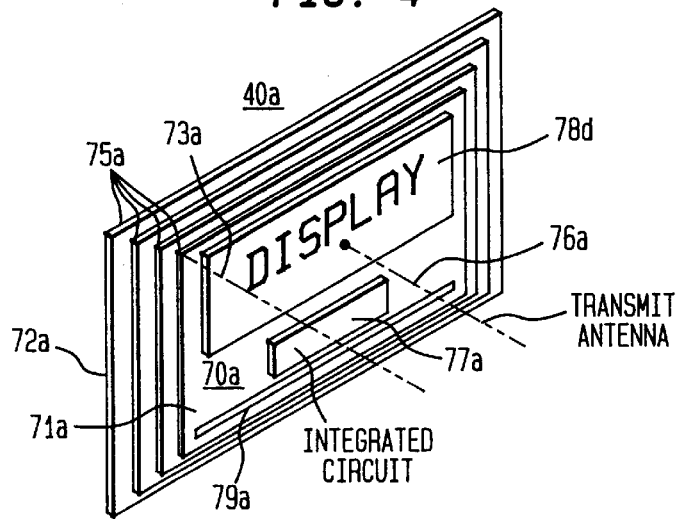
FIG. 4 is an isometric view of one of the FIG. 1 devices when rotated to a vertical position from its horizontal position shown in FIGS. 1 and 3.
Figure 5:
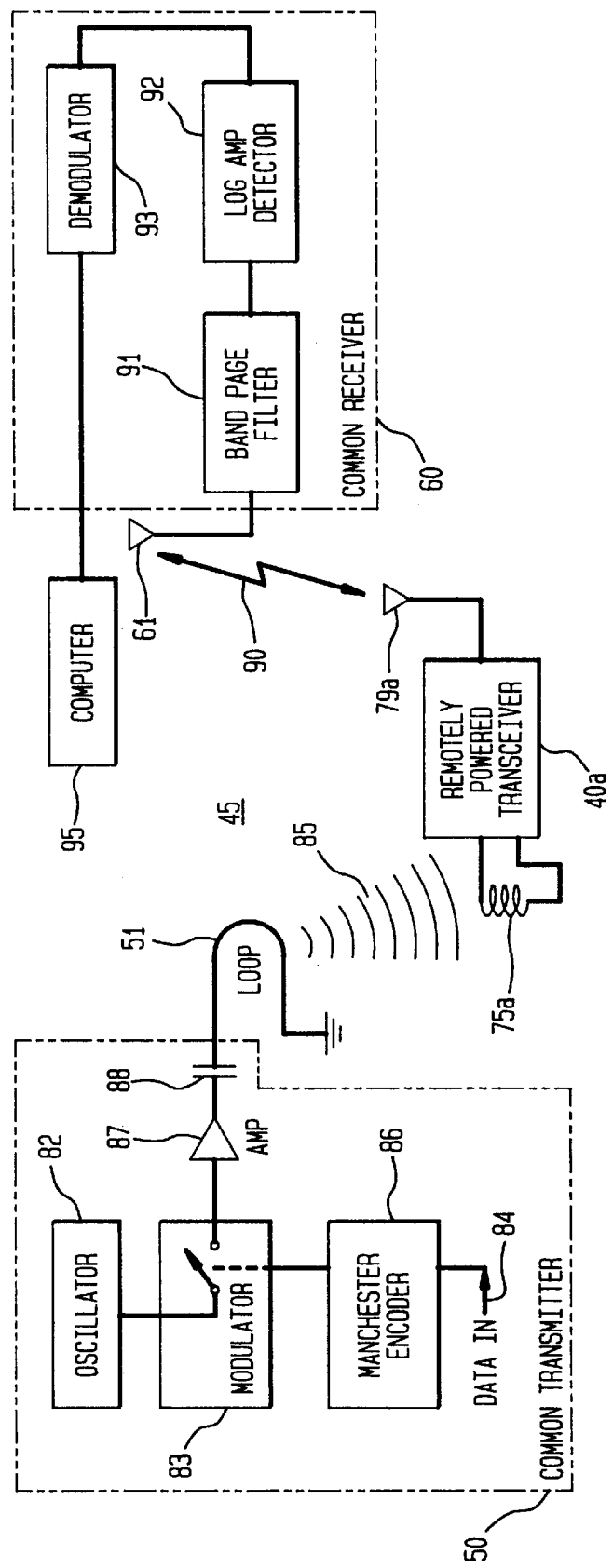
FIG. 5 is a schematic view of electrical aspects of the FIG. 1 transceiver system used in connection with the FIG. 1 room.

Turning now to FIG. 4, the shown price label device 40a is typical of the other price label devices 40 used in transceiver system 45 (FIG. 5). Device 40a includes an insulative support means 70a in the form of a flat plastic rectangular board which is a composite board consisting of front and back rectangular plastic plates 71a and 72a spaced apart by and joined to a thicker central rectangular spacer plate (not shown). The spacer plate is smaller in both its rectangular dimensions than plates 71a and 72a so that the composite board 70a has formed in its periphery a groove (not shown) extending all the way around the board. The largest linear dimension of board 70a is the length of the line extending between two corners of the board which are diagonally opposite each other and on opposite sides of the board. That length can, however, as a practical matter be considered the same as the length of the line 73a shown in FIG. 4 as extending between corners of board 70a which are diagonally opposite each other but on the same side of the board 70a.

Figure 3:
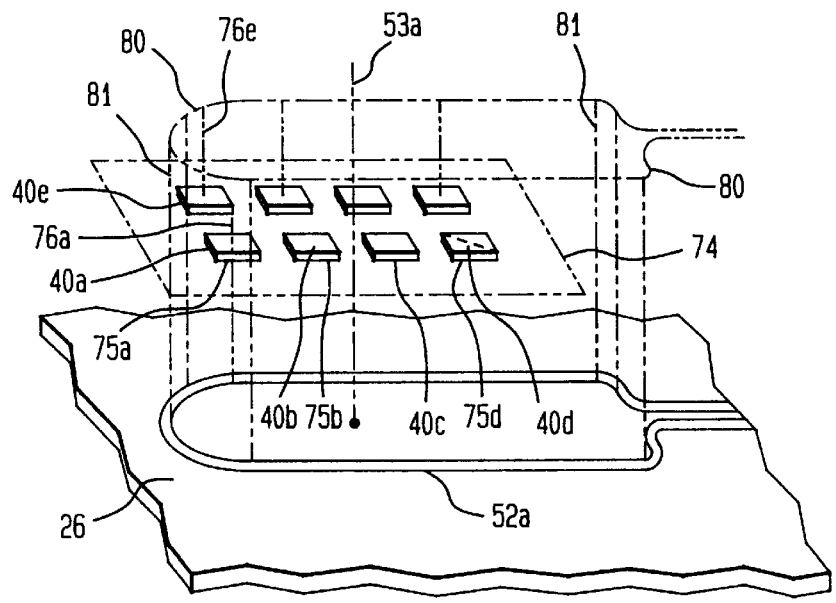
FIG. 3 is an isometric geometric diagram showing a broken-away part of the floor of the FIG. 1 room, and a region of space in the room above that part of the floor.

The mentioned groove has received therein a multi-turn coil 75a of insulated wire wound into the groove so that the coil extends around the periphery of board 70a and makes contact around its periphery with the board 70a. Coil 75a is radially spaced from an axis 76a therefor passing through the board. Axis 76a is shown in FIG. 4 as being horizontal because FIG. 4 shows device 40a in an up-ended position, but axis 76a would normally be vertical (FIG. 3). The coil 75a serves as a receiving antenna for device 40a and is sometimes referred to herein as a secondary coil. Secondary coil 75a is of much smaller diametral size than primary coil 52a.

Other components of device 40a mounted by board 70a are electronic circuit means 77a coupled to coil 75a to operate in response to waves received thereby, a display panel 78a controlled by circuit means 77a to display originally entered or subsequently updated prices of the goods 38a associated with device 40a (FIG. 1), and a quarter wavelength stub antenna 79a coupled to a transmitter stage included in circuit means 77a for the purpose of generating microwaves transmitted from device 40a via antenna 79a to common receiver 61 antenna. As shown, all of elements 77a–79a are mounted by board 70a radially inward of the coil 75a on the front plate 71a of the board 70a.

The preferred positional relationship between an antenna coil for the long wavelength transmitter 50 and the price label devices 40 displayed in room 25 is depicted in FIG. 3. That figure shows only the portion of room 25 which includes the antenna coil 52a which encircles case 35a and the devices 40 supported by the top shelf 37, the case itself having been removed from the FIG. 3 showing and having been replaced by a horizontal plane 74 in which the last named devices lie.

The devices 40 supported by the top shelf and other shelves of case 35a are all disposed in room 25 in a volume of space bounded by the geometric cylindrical surface 80 shown in FIG. 3. Surface 80 is generated by using the periphery of coil 52a as the directrix line for creating the surface and by moving a generatrix line 81 around that periphery in a manner such that at all times during that movement, the line 81 intersects the directrix and, also, is parallel to coil axis 53a and remains parallel to itself. Such movement of the generatrix 81 sweeps out the cylindrical surface 80.

In the arrangement illustrated in FIG. 3 all of the devices 40 which are both shown and unshown by that figure are spaced away from the longwave primary antenna coil 52a by a distance which is much less than the 9 mile wavelength characterizing the 20 KHz electromagnetic wave by which the coil 52a is excited in the course of operation of transceiver system 45. As a result, the transmitting coil 52a is wireless coupled to the respective receiving coils 75 (FIG. 4) of all such shown and unshown devices 40 by what is referred to on page 395 of the text, "Ultra High Frequency Techniques," authored by Brainerd, Koehler, Reich and Woodruff and published in 1942 by D. Van Nostrand Company, Inc. as the "local or the induction field." Such coupling field is said to be important where the coupled transmitter and receiver are spaced apart by less than twice the wavelength of the transmitted waves. An induction field coupling of the respective antennas of a transmitter and receiver is akin to the well known magnetic coupling which, on the one hand is, (as shown by FIGS. 3 and 4 taken together) several times greater than the largest linear dimension of device 40 (as approximately represented by the diagonal lines 73 shown in FIG. 3) and, on the other hand, occurs in a transformer between its primary and secondary windings, whence comes the terminology used herein of referring to the antenna elements of the common transmitter 51 and the label devices 40 as, respectively, a "primary" coil or coils 52 and "secondary" coils 75.

Treating the induction field coupling 85 (FIG. 5) between primary coil 51 and the secondary coils of the devices 40 shown in FIG. 3 as a magnetic coupling, the flux lines of the alternating magnetic field generated by coil 52a can be considered as passing upward through that coil in a direction which is wholly vertical in the plane of the coil but which departs more and more from the vertical with greater distance upward from the coil until the flux lines bend over and reverse their vertical direction and encircle coil 52a to ultimately close back on themselves.

Within, however, the cylindrical surface 80 and the short upward distances by which the devices 40 within that cylinder are spaced away from the primary coil 52a, the flux lines from coil 52a reasonably approximate wholly vertical lines.

Moreover since the secondary coils 75 of these devices have a horizontal lie (with the result being that their axes 76 are vertical), the orientation of these coils is such as to maximize the number of magnetic flux lines generated by primary coil 52a which pass through each secondary coil 75. Also the density of the flux which passes through each of the coils 75 is substantially uniform from coil to coil. Thus, the positioning represented in FIG. 3 of the coils 75 of the devices 40 in cylinder 80 relative to the coil 52a provides optional efficiency and uniformity of coupling between that transmitting coil and the receiving coils of the plurality of devices 40 served by their common transmitter 50. Another advantage of the FIG. 3 positioning arrangement wherein both the transmitter coil 52a and the receiving coils 75 of the shown devices 40 are horizontal is that the devices 40 may be rotated around their axes 76 to assume any respective angular positions in the horizontal plane without decreasing the efficiency and uniformity of coupling between the primary coil and the secondary coils.

In the indoor transmitter-receiver system described, the system will work well even though the induction field coupling between the transmitting antenna 51 and the receiving antennas 75 of the devices 40 does not realize the optimal efficiency and uniformity of coupling provided by the positioning relations shown in FIG. 3. Thus, for example, the devices 40 served in room 25 by common transmitter 50 need not all be within cylindrical surface 80 or a similar cylindrical surface generated by using coil 52b as the directrix and a line parallel to that coil's axis 53b as the generatrix. Further, the coils 75 of devices 40 inside or outside such cylindrical surfaces may be tilted from the horizontal, and the spacing of those devices from the primary antenna coil or coils may be greater than represented in FIG. 3. As another variant, the common transmitter antenna coil or coils may have a vertical lie with the receiving coils of devices (preferably but not necessarily also having a vertical lie parallel to that of the antenna coil), to better assure that all the coils of the devices 40 in room 25 have an optimal induction field coupling to the antenna 51 of the common transmitter. Another variant antenna may consist of three primary coils orthogonally aligned with each other so that the axis of each of these coils is at right angles to each axis of each of the other two coils.

Referring now to FIG. 5, the 20 KHz electromagnetic waves propagated into room 25 by antenna 51 are originally generated in transmitter unit 50 by an oscillator stage 82 providing a continuous output of such waves to a modulator stage 83. A data input 84 for unit 50 receives binary digital baseband signals occurring at a 1 KHz data rate and constituting control signals and data. Those signals are supplied in unit 50 to a Manchester encoder 86 which operates on those "0" and "1" baseband signals to convert them into Manchester encoded signals and, incidentally, to increase their data rate to 2 KHz. The function performed by encoder 84 is later discussed in more detail.

After the signals to transmitter unit 50 have been Manchester encoded, they are supplied to on-off AM modulator stage 86 which operates like a switch to pass and not pass to its output the 20 KHz carrier waves when, the Manchester encoded signals have high and low values. The result is that the transmitted waves as they appear at the modulator output are in the form of a train of bursts of 20 KHz waves which are intermittent in the sense that between the occurrence of such bursts, there are times in which there are no such waves. As later more fully explained, the transmission of such waves from the unit occurs over periods within which such waves may be either modulated or unmodulated by signals.

From the modulator 83, the described 20 KHz waves in the form of a long duration train of wave bursts is amplified by a power amplifier 87 and is then applied to a series LC circuit consisting of antenna 51 and a capacitor of a capacitance value selected to make that circuit resonant at 20 KHz (or other frequency chosen for the transmitted waves) to thereby permit more efficient and greater transfer of R.F. power from amplifier 87 to the antenna 51 than if it were not part a resonant circuit. When antenna 51 is so excited by the electromagnetic waves from transmitter 50, it propagates them into the space in room 25 and via the induction field coupling 85 to the price label devices 40 which are in that room, and of which the shown device 40a (FIG. 3 and FIG. 4) is exemplary.

When, as earlier described, the device 40a is signaled to feed back information to the user of system 45, the antenna 79a of that device is caused to emit a burst of electromagnetic waves which are microwaves having a frequency of about 900 MHz and a wavelength of about one foot. Those microwaves are transmitted to the common receiver antenna 61 which is (FIG. 1) a circularly polarized antenna comprising two quarter wave-length stubs at right angles to each other. The antenna is mounted on the ceiling of room 25 to be spaced away from the devices 40 therein by a distance equal to an appreciable number of wavelengths of the transmitted microwaves. The transmission of such waves from the antennas 79 of devices 40 to common receiver antenna 61 occurs because of a coupling 90 (FIG. 5) of those device antennas and that receiver antenna by a field which is described on pages 396–398 of the mentioned text, "Ultra-High Frequency Techniques," as being a "radiation field" existing between the transmitter and receiver when the distance between them is appreciably greater than one wavelength of the transmitted wave.

The RF waves received by antenna 61 are passed through a bandpass filter 91 in receiver 60 and then through a logarithmic amplifier 92 therein. The amplified waves are converted by a demodulator 93 into a baseband signal or signals, and that signal or signals is supplied to a computer 95 which is also coupled to transmitter 50 by interconnection means (not shown) to control its operation and inputs. The computer 95 is programmed and directed by the use of system 45 to cause the system to automatically operate devices 40 to display updated prices and to provide confirmation that updating has taken place.

Figure 6:
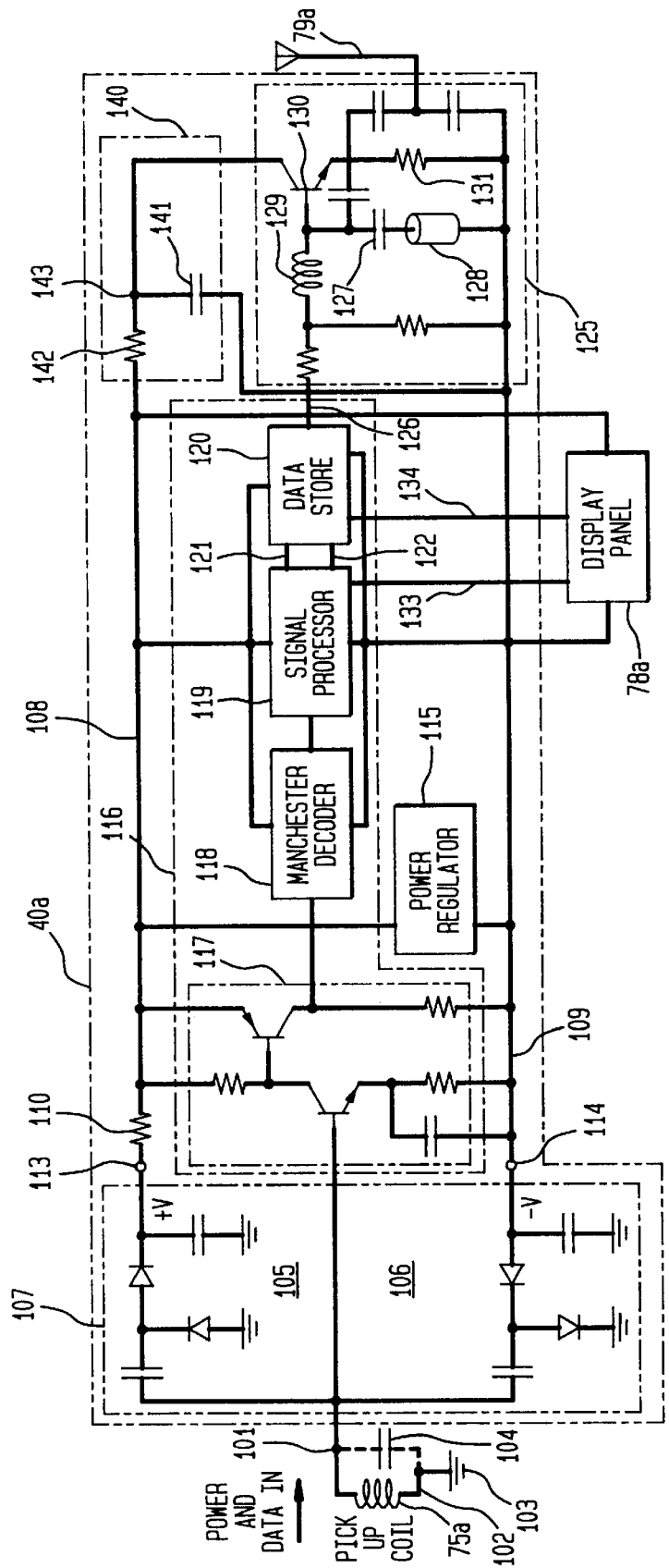
FIG. 6 is a view, partly in schematic diagram and partly in block diagram of the circuitry and other electrical features of the FIG. 4 device.

Circuit details of the transceiver device 40a are shown in FIG. 6. The pick-up coil 75a of that coil has a resistance of about 3000 ohms and is made resonant at the 20 KHz frequency of the waves transmitted thereto by distributed capacitance represented in FIG. 6 by the dotted-line capacitor 104 shown as connected between the high and low ends 101 and 102 of the coil between which the coil's wire extends. Low end 102 of the coil is shown connected to a ground 103 but such ground is only an electrically isolated internal ground for device 40a since the device has no external grounding to earth.

The high end 101 of coil 75a is connected to upper and lower capacitor-rectifier circuits each including two capacitors each of 0.1 microfarad capacitance values. Those circuits 105, and 106 together form for device 45a a first stage 107 for supplying DC power between power supply leads 108, 109 of which lead 108 is connected to circuit 105 through a 1 megohm voltage dropping resistor 110. The circuits 105 and 106 are each doublers of the peak voltages of, respectively, the positive and negative half cycles of the AC energy appearing in coil 75a between its ends 101, 102 so as to produce voltages of +V and −V with respect to internal ground 103 on leads 108 and 109. Accordingly, stage 107 is a peak voltage quadrupler stage from which can be withdrawn from the stage between the terminals 108, 109 DC energy having a voltage which in practice is kept to a value of about 1.5 volts.

Figure 7:
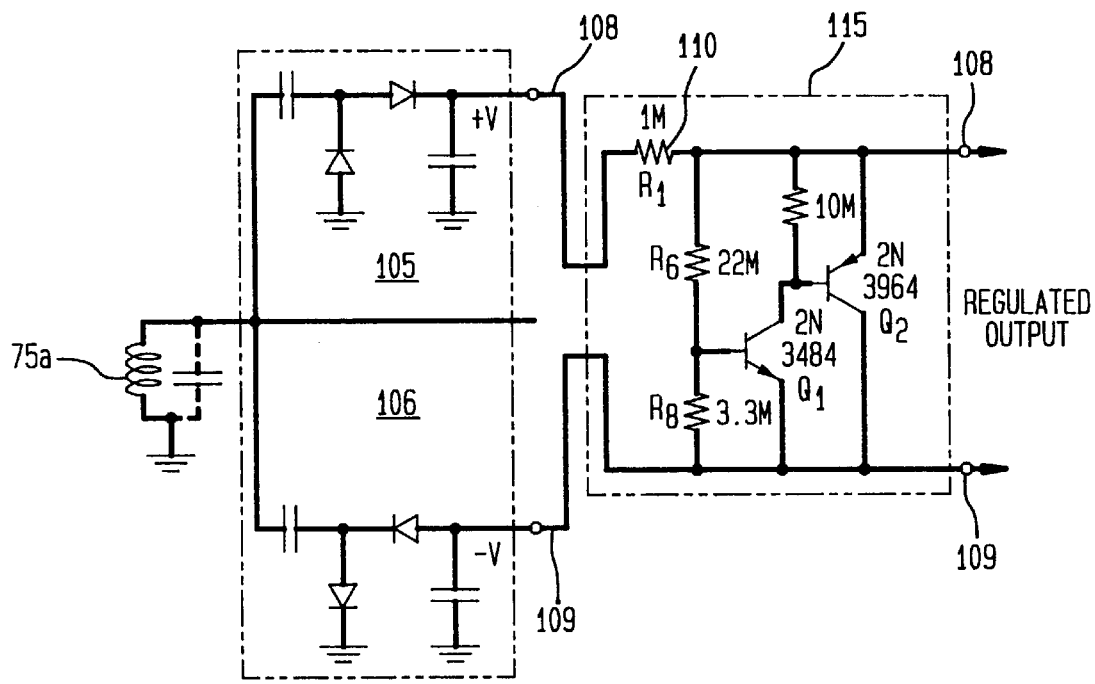
FIG. 7 is a circuit diagram of the first power supply stage and of the power regulator stage of the FIG. 6 circuitry.

To maintain the output of DC power supply stage 107 at approximately that 1.5 volt value, a power regulator stage 115 is connected between power supply leads 108, 109. The circuit used to perform that power regulating function is shown in FIG. 7 but will not be described herein in detail. It suffices to say that such circuit keeps steady at about 1.5 volts the output voltage of stage 107 which, without the regulation afforded by stage 115, could rise to almost 100 volts if device 40a were to be disposed in room 25 very near primary antenna coil 52a.

The stage 107 supplies DC power to electrically energized means 116 providing a resistive load directly connected between the output terminals 108, 109 of stage 107. Such means 116 comprises a detector stage 117, having its input connected to the high end 101 of coil 75a, a Manchester decoder 118 having its input connected to detector 117 and its output connected to signal processing stages 119, and a semiconductor memory 120 supplied from stages 119 over signal transfer paths 121 and 122, respectively, with control signals and data. Detector stage 117 converts the bursts of R.F. waves appearing across coil 75a into baseband signals of "1" value separated by times constituting "0" value signals. Manchester decoder 118 converts those signals from detector 117 into the original format they had before being passed through encoder 86 (FIG. 5). The stages 119 perform processing functions on these decoded signals including differentiating them into control signals and signals representing data. The data signals are fed over signal transfer means 121 to memory 120 to cause the data represented by these signals to be stored in stage 120 under the control of signals supplied by signal transfer means 122 which (signals) may also cause data store 120 to perform other functions.

The initial power supply stage 107 also provides power, when, needed to operate the display panel 78a (FIG. 4) which is supplied with such power by being connected directly between the output terminals 108 and 109 of stage 107. Panel 78a is connected to stages 119 and 120 by, respectively, leads 133 and 134 to respond to inputs of control signals from stage 119 and data from data stage 120 to visibly display numbers which in this case represent prices.

The data storage stage 120 is an EPROM semiconductor memory which stores data in a non-volatile manner. Display panel 78a may be a conventional liquid crystal display panel. Alternatively, the display panel 78a may be a non-volatile panel in which data is retained in the absence of voltage being applied to the panel. An example of such a panel is the one disclosed in U.S. Pat, No. 5,181,131 issued Jun. 19, 1993 to Yamazaki, et al for "Power Conserving Driver Circuit For Liquid Crystal Displays". Except during times when changes are being made in data stored or displayed, the data storage stage 120 and the non-volatile display panel 78a add very little to the resistive load on the first power supply stage 107.

Besides the stages already discussed, the circuitry of device 40a includes a transmitter stage 125 turned "on" and "off" by signals on lead 126 from data store stage 120. The effect of receipt by stage 125 of such an "on" signal is to set into oscillation a resonant or "tank" circuit consisting of capacitor 127 and a coaxial line section 128 providing a quarter wave length coaxial line shorted at its end away from the capacitor. The oscillations in such resonant circuit are isolated from the data store 120 by an R.F. choke 129. The oscillations initially developed in the resonant circuit by the onset of the "on" signal are sustained by a transistor 130 which responds to the oscillations to amplify them and then feed back a portion of the amplified oscillating energy to the resonant circuit. Another portion of such amplified energy is supplied from transistor 130 to the up-link antenna 79a to excite it to transmit into room 25 the described 900 MHz microwaves for the duration of the "on" signal received by stage 25. When that signal ceases, the transmission of microwaves from antenna 79a also ceases.

Substantially more DC power is needed to operate the transmitter stage 125 when "on" than all of the other circuit stages in device 40a. There is, therefore, provided in that device solely for transmitter stage 125 a second DC power supply stage 140 which derives the DC energy it supplies from the first power supply stage 107 but is capable of delivering DC power for a short time period at a much greater wattage than the stage 107 would be capable of doing over that period.

Power supply stage 140 comprises a capacitor 141 of 1 microfarad capacitance and a ten megohm isolating resistor 142 connected in series so as to have a common junction 143, the ends of the resistor and capacitor away from that junction being connected to, respectively, the output leads 108 and 109 of first power stage 107. DC power is supplied from stage 140 to stage 125 by a connection of transistor 130 and a resistor 131 in series between the output lead 109 of first power stage 107 and the junction 143 in the second power stage 140.

Both the capacitors in stage 107 and the capacitor 141 are charged by DC current flowing thereto from, respectively, the pick-up coil 75a and the resistor 142 in stage 140 to store that charge as available DC energy until that energy is withdrawn by discharge of the capacitors. The rates at which the capacitors receive charge is directly proportional to the resistance in the charging paths therefor, and the energy stored by the capacitors for a given voltage across it is directly proportional to their capacitance. Resistor 142 has a much greater resistance than the total resistance of coil 75a and all the rectifiers in stage 107 and, in fact, has a greater resistance than that of the resistive load apart from stages 125 and 140 which is coupled across the output 113, 114 of the circuits 105, 106 of stage 107. On the other hand, capacitor 141 has a greater capacitance than the total of all the capacitors in stage 107. As a result, assuming that all the capacitors in both stages 107 and 140 are initially uncharged, the capacitor 141 will charge up much more slowly to the full voltage thereacross than will each of the capacitors in stage 107, but once all these capacitors have become fully charged, the capacitor 141 stores a greater amount of DC energy obtainable by its discharge as DC power than the total amount of DC energy so stored by the several capacitors in stage 107. The charging rate of the capacitors in stage 107 is, of course much greater than their rate of discharge upon termination of energy received thereby from coil 75a.

When, as earlier described, the transmitter stage 125 is turned "on," its transistor 130 and associated electrical elements changes from a very high resistance load to a low resistance load coupled between the opposite sides of capacitor 141. In response to that change, current flows from capacitor 141 to discharge the charge stored therein (at a rate much faster than the charging rate for capacitor 141) and to provide the power to operate the transmitter stage 125 for a period which may have exemplary durations of from 1 microsecond to 10 microseconds depending on how much information is to be transmitted in that period. During that period, the resistor 142 performs the important function that its very high resistance isolates the relatively low resistance which transmitter stage 125 has during its "on" period from the output terminals 108, 109 of the first power supply stage so as, thereby to prevent the capacitors of that stage from becoming significantly discharged by the low resistance of "on" transmitter stage 125 being effectively coupled in parallel with the resistive load provided by the other circuits of device 40a and already coupled between those output terminals.

The use of the two described cascaded DC power supplies in device 40a affords the advantage that the device can operate solely from energy derived from received electromagnetic waves of low field strength (i.e., without the inclusion of any battery in the device), and with a small amount of energy storage capacitance therein, both to continuously energize the majority of its circuit components which draw only low power and to provide for high power circuit usage for intermittent short periods occurring during such continuous low power usage.

USE OF EMBODIMENT

Before the system 45 is started up, the various price label devices 40 may be pre-programmed to each store data (a) representing an address code uniquely identifying that device, and (b) if, desired, the initial price for the goods with which the device is to be used. The devices 40 are then placed in the room 25 at their proper locations, and the down-link or common transmitter 50 is turned "on."

Figure 8:
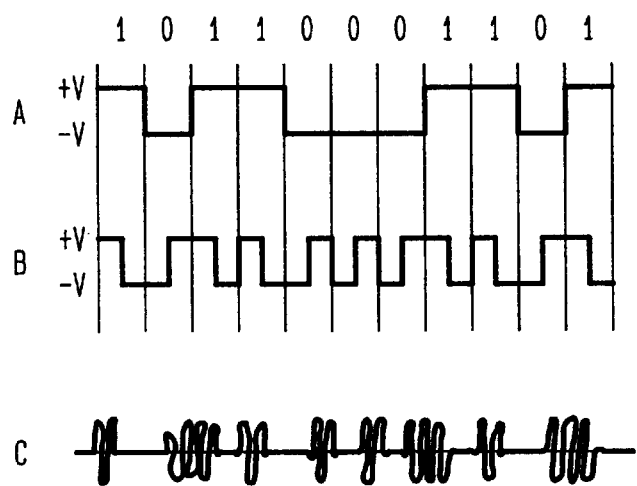
FIG. 8 constitutes three wave form diagrams relating to Manchester encoding used in conjunction with the FIG. 5 system.

During any operation of system 45 the transmitter 50 preferably (but not necessarily) "transmits" for the entire indeterminable period of time which is the duration of that operation. That is, over that time period, the transmitter 50 under the control of its Manchester encoder 86 transmits R.F. waves in the form of intermittent bursts thereof both when digital "0" and "1" signals are being received and are not being received at the input 84 for the encoder. Specifically, as shown in FIG. 8 which is taken from page 80 of the text, "Digital Communications, Fundamentals and Applications," authored by Bernard Sklar and published in 1988 by Prentice Hall, for the entire period of operation of system 45, encoder 86 senses at its input 84 either a positive voltage occurring during successive unit time intervals which are contiguous or separated or, alternatively, zero voltage occurring during successive unit time intervals which are contiguous or separated but which intervene the positive voltage time intervals (waveform A). The device 86 encodes each unit of positive voltage (which represents the digital signal "1") by dividing its time interval into first and second half intervals by keeping the voltage positive for the first half interval while reducing it to zero for the second half interval (waveform B). Similarly the devices 86 encodes each unit of zero voltage (which may represent either the digital zero "0" or no signal at all) into first and second half intervals and keeping the first half interval at zero voltage while producing positive voltage in the second half interval (waveform B).

The resulting train of contiguous or separated half intervals of positive voltage and of times intervening them of contiguous or separated half intervals of zero voltage are applied in transmitter 50 to modulator 83 to produce as the transmitter's output the afore-described train of intermittent bursts of 20 KHz R.F. waves which are represented by waveform C. Manchester encoding thus has the effect that, when a transmitter of R.F. waves is being on-off modulated by "0" and "1" digital at times alternating with other times during which the transmitter is not being modulated by any signals, the transmitter will transmit bursts of waves during times of non-modulation at the same average repetition rates as during times of modulation to thereby maintain constant at all times during the transmitter's operation the average R.F. power propagated into space by the transmitter. In the case of the receiving devices 40 which are serviced by transmitter 50 but have no external ground to so keep consistent such average propagated R.F. power is advantageous because it avoids the distortion which would otherwise take place in the d.c. level effective in those devices for the baseband signals processed therein. Another advantage of so keeping constant such average R.F. power propagated by transmitter 50 both at times when the waves transmitted thereby are modulated by signals and are not so modulated is that it provides for devices 40, both at times when such waves are modulated and when they are unmodulated, a source of power which on the average is continuous and constant and permits these devices to operate without any batteries therefor.

The detector stages 117 and Manchester decoders 118 in devices 40 perform operations which are the reverse of those described above as performed by encoder 86 and modulator 83 of transmitter 50.

Once the system 45 has been set into operation as described, and assuming that the devices 40 have been pre-programmed to display initial prices of their associated goods, the transmitter 50 remains unmodulated by signals until the time comes to update some of those prices. The transmitter then responds to signals directing it to update the prices displayed by certain of these devices to selectively "call" a first of those devices by propagating waves which are modulated by signals to initially pick out a first of such devices by transmitting a signal identifying such device by its address code, and by subsequently transmitting control and data signals controlling that device to erase old price data from its data store 120 and display panel 78, replace that old price data by new price data, and then actuate the up-link transmitter 125 of that device to signal common receiver 60 that the updating of that device has been completed. The same procedure is followed to update one at a time the remainder of the devices 40 whose displayed prices need updating. During the time that any such device is being updated by modulated waves from transmitter 50, both that device and all other of devices 40 continue to be refreshed with DC power from those modulated waves, but otherwise such modulated waves have no effect in the signal handling circuit components of the other devices because the latter devices have not been picked out by an identifying signal to subsequently process transmitted control signals and data.

The transmission for signaling purposes of microwaves from an updated device 40 to up-link receiver 60 may take various forms. For example, such transmission may be merely a single burst of waves produced by a "called" device 40 after the identifying signal for that device has been sent out by transmitter 50, such burst indicating merely that such device has received that signal. At the other extreme, such transmission may take the form of a train of microwaves modulated by signals specifying the new replacing data which has actually been entered into the "called" device and permitting comparison between that entered data and the replacing data actually communicated to such device by the transmitter 50.

When the display panels 78 of devices 40 are non-volatile, the transmitter-receiver system 45 may be turned off either deliberately or inadvertently, and during the period when such system is "off" the devices will continue to display the updated prices which latest have been entered into them. It follows that system 45 may be used only at night to update prices, and may be turned off during the day so as to avoid thereby the propagation by transmitter 50 and the device transmitters 125 of radiation into room 25. When the system is turned back on to renew the flow of power from transmitter 50 via induction field coupling 85 to devices 40, the power stages 107 and 140 of those stages become fully charged in, respectively, less than one second and about three minutes so that all the devices 40 become fully operational in a short time.

Some operating parameters of the system are as follows.

While 20 KHz has been given as an exemplary frequency value of the waves emitted by transmitter 50, the frequency of these waves may conveniently be anywhere in the 20–50 KHz range which is not a critical range for that frequency. Preferably, however, the frequency of the waves from transmitter 50 lies within the range which spans the 3 KHz–30 HKz and the 30 KHz–300 KHz bands which are referred to in the Radio Frequency Table as, respectively, the "very low frequency" and "low frequency bands." Similarly, while 900 MHz has been given as the exemplary value of the frequency of the microwaves transmitted from devices 40 because that frequency lies within a frequency band convenient to use, that frequency value is not critical. It may, for example, be determined by the length desired to be used for the quarter wave antennas 79 incorporated (FIG. 4) in those devices.

Indeed, although the waves transmitted by devices 40 were chosen to be microwaves (i.e., electromagnetic waves of a wavelength between and including the values 100 centimeter and 1 centimeter) because microwaves are easy to produce and permit transmission of a relatively large amount of information during a burst of such waves which is short as, say, in the range of 1–10 microseconds, the devices 40 may transmit waves longer in wavelength than microwaves. For the purpose of transmitting these longer wavelength waves, devices 40 may use either an up-link transmitting antenna separate from the down-link receiving antenna as heretofore described or, alternatively, may use part or all of such normally receiving antenna to transmit such up-link waves from device 40. There is no critical frequency for such transmitted up-link waves except that they should be different in frequency than the waves from down-link transmitter 50 in order to avoid interference with the transmission of the latter waves.

The use in system 45 of waves of low frequency from transmitter 50 to service the price label devices 40 affords not only the advantages aforementioned but also the additional advantages that, because of the strong transmitter-receiver link required to provide the devices 40 by wireless with remote power, the possibility of control signal and data transmission errors is almost zero. Further, the cost of providing most of the circuit components is greatly reduced as compared to what such costs would be if these components had to operate at microwave frequencies.

The aforedescribed embodiment of the invention being exemplary only, it is to be understood that additions thereto, omissions therefrom and modifications thereof can be made without departing from the spirit of the invention. For example, in lieu of utilizing Manchester encoding to provide a steady flow of power to devices 40 from transmitter 50 during periods when either the transmitter is or is not receiving signals at its input 84, the unit 50 can transmit waves continuously, and these waves can modulated by frequency shift keying to convey such signals. Accordingly, the invention is not to be considered as limited save as is consonant with the recitals of the following claims.

I claim:

1. A battery-less informative device comprising,
a panel for providing a display of information and responsive to electrical inputs to update said display,
an antenna to receive low frequency electromagnetic waves from a control system for controlling the display of information on said panel,
a first power generating circuit coupled to said antenna and energizable by said received low frequency electromagnetic waves to provide power to operate the informative device,
a circuit communicatively coupled to said antenna that decodes the information from said received low frequency electromagnetic wave to provide said electrical inputs to said panel, and
a transmitter coupled to said circuit that is energizable by said received low frequency electromagnetic waves to transmit a short burst of microwaves modulated with a feedback signal to the control system; and a second power generating circuit coupled to said transmitter that generates power directly to said transmitter, wherein said first power generating circuit provides the dc power input to said second power generating circuit, the second power generating circuit does not provide power to the information device, wherein the informative device operates solely from energy derived from the received low frequency electromagnetic waves.

2. The informative device of claim 1 in which the information displayed by said panel is non-volatile so as to be retained after an interruption of reception by said informative device of said low frequency electromagnetic waves.

3. The informative device of claim 1 wherein said circuit is operable to decode Manchester encoded signals in the received low frequency electromagnetic waves.

4. The informative device of claim 1 wherein said first power generating circuit comprises at least one capacitor-rectifier circuit.

5. The information device of claim 1, wherein the received low frequency electromagnetic waves are between 20 KHz and 50 KHz.

6. The information device of claim 1, wherein the received low frequency electromagnetic waves are between 3 KHZ and 30 KHz.

7. The information device of claim 1, wherein the received low frequency electromagnetic waves are between 30 KHz and 300 KHz.

8. The information device of claim 1, wherein the received low frequency electromagnetic waves are between 3 KHz and 300 KHz.

9. The information device of claim 1, wherein the short bursts of microwaves have a frequency of 900 MHz.

* * * * *